United States Patent
Hwang et al.

(10) Patent No.: US 11,233,661 B2
(45) Date of Patent: Jan. 25, 2022

(54) DEVICE AND METHOD FOR AUTHENTICATING APPLICATION IN EXECUTION ENVIRONMENT IN TRUST ZONE

(71) Applicant: Samsung Electronics Co., Ltd., Suwon-si (KR)

(72) Inventors: Jinha Hwang, Suwon-si (KR); Kyungsoo Kwag, Suwon-si (KR); Inho Kim, Suwon-si (KR); Dongsun Lee, Suwon-si (KR); Jungkyuen Lee, Suwon-si (KR); Jongtak Lee, Suwon-si (KR); Kyungim Jung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 39 days.

(21) Appl. No.: 16/800,188

(22) Filed: Feb. 25, 2020

(65) Prior Publication Data
US 2020/0274718 A1    Aug. 27, 2020

(30) Foreign Application Priority Data

Feb. 27, 2019 (KR) .................. 10-2019-0023292

(51) Int. Cl.
*H04L 9/32* (2006.01)
*H04L 9/08* (2006.01)
*H04L 9/06* (2006.01)

(52) U.S. Cl.
CPC .......... *H04L 9/3263* (2013.01); *H04L 9/0643* (2013.01); *H04L 9/0825* (2013.01); *H04L 9/3242* (2013.01); *H04L 9/3247* (2013.01)

(58) Field of Classification Search
None
See application file for complete search history.

(56) References Cited

U.S. PATENT DOCUMENTS

| | | |
|---|---|---|
| 9,100,172 B2 | 8/2015 | Kim et al. |
| 2014/0245013 A1* | 8/2014 | Kim ................ H04L 63/10 713/171 |
| 2016/0092701 A1 | 3/2016 | Shah et al. |
| 2017/0214662 A1* | 7/2017 | Chu .............. H04L 63/0823 |

FOREIGN PATENT DOCUMENTS

| | | |
|---|---|---|
| KR | 10-2018-0092596 A | 8/2018 |
| WO | 2018/162040 A1 | 9/2018 |

OTHER PUBLICATIONS

International Search Report with Written Opinion dated Jun. 5, 2020; International Appln. No. PCT/KR2020/002684.

* cited by examiner

*Primary Examiner* — Jeffrey C Pwu
*Assistant Examiner* — Mayasa A. Shaawat
(74) *Attorney, Agent, or Firm* — Jefferson IP Law, LLP

(57) ABSTRACT

A device and a method for authenticating an application in an execution environment in a trust zone are provided. The method includes executing a client application (CA) in a normal world, receiving, in the normal world, a request for receiving a service of a trusted application (TA) of a secure world from the CA, acquiring, when the request is received in the normal world, source information of the CA loaded in a memory of the device, acquiring, in the normal world, first hash information from the source information, providing, to the secure world, the first hash information together with signature information and a sub certificate included in the CA, and authenticating the CA based on the sub certificate and a root certificate of the TA in the secure world.

22 Claims, 8 Drawing Sheets

DEVICE AND METHOD FOR AUTHENTICATING APPLICATION IN EXECUTION ENVIRONMENT IN TRUST ZONE

CROSS-REFERENCE TO RELATED APPLICATION(S)

This application is based on and claims priority under 35 U.S.C. § 119(a) of a Korean patent application number 10-2019-0023292, filed on Feb. 27, 2019, in the Korean Intellectual Property Office, the disclosure of which is incorporated by reference herein in its entirety.

BACKGROUND

1. Field

The disclosure relates to a device and method for authenticating an application in an execution environment in a trust zone. More particularly, the disclosure relates to a device and a method for authenticating a client application (CA) using a trusted application (TA).

2. Description of Related Art

An ARM trust zone (hereinafter, referred to as a trust zone) is a technique for preventing attacks against a modulating operating system (OS) by using a root kit for example. The trust zone is used as a means for providing a trusted execution environment (TEE) for mobile and embedded devices. The trust zone is used to protect services requiring security, such as an encryption key service, a payment service, and a digital rights management (DRM) service. Through a hardware-based access control, a trust zone separates a service requiring security from a rich execution environment (REE) hosting a general OS.

In a typical trust zone-based execution environment, an access control on a trusted application (TA) executed on a secure OS is needed, and when an arbitrary client application (CA) knows a universally unique identifier (UUID) of the TA, the arbitrary CA can transmit commands to the TA. However, there is a risk that a malicious program disguised as a CA will request the TA to execute illegal commands.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a device and method for authenticating a client application (CA) in an execution environment in a trust zone by using a root certificate and a sub certificate of a trusted application (TA).

Another aspect of the disclosure is to provide a device and method for authenticating a CA in a secure world by using source information of the CA loaded in a memory of the device.

Another aspect of the disclosure is to provide a device and method for authenticating a CA by encrypting/decrypting a sub certificate corresponding to a root certificate of a TA and hash information generated from source information of the CA.

Additional aspects will be set forth in part in the description which follows and, in part, will be apparent from the description, or may be learned by practice of the presented embodiments.

In accordance with an aspect of the disclosure, a method performed by a device of authenticating an application in an execution environment in a trust zone is provided. The method includes executing a client application (CA) in a normal world, receiving a request for receiving a service of a trusted application (TA) of a secure world from the CA in the normal world, acquiring, when the request is received, source information of the CA loaded in a memory of the device in the normal world, acquiring first hash information from the source information in the normal world, providing the first hash information together with signature information and a sub certificate included in the CA to the secure world, and authenticating the CA based on the sub certificate and a root certificate of the TA in the secure world.

In accordance with another aspect of the disclosure, a device for authenticating an application in an execution environment of a trust zone is provided. The device includes a memory storing one or more instructions, and at least one processor configured to execute the one or more instructions, wherein the at least one processor is configured to execute the one or more instructions to execute a client application (CA) in a normal world, receive a request for receiving a service of a trusted application (TA) of a secure world from the CA in the normal world, acquire, when the request is received, source information of the CA loaded in the memory of the device in the normal world, acquire first hash information from the source information in the normal world, provide the first hash information together with signature information and a sub certificate included in the CA to the secure world, and authenticate the CA based on the sub certificate and a root certificate of the TA in the secure world, wherein a part of the memory and a part of the at least one processor are assigned to the secure world.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
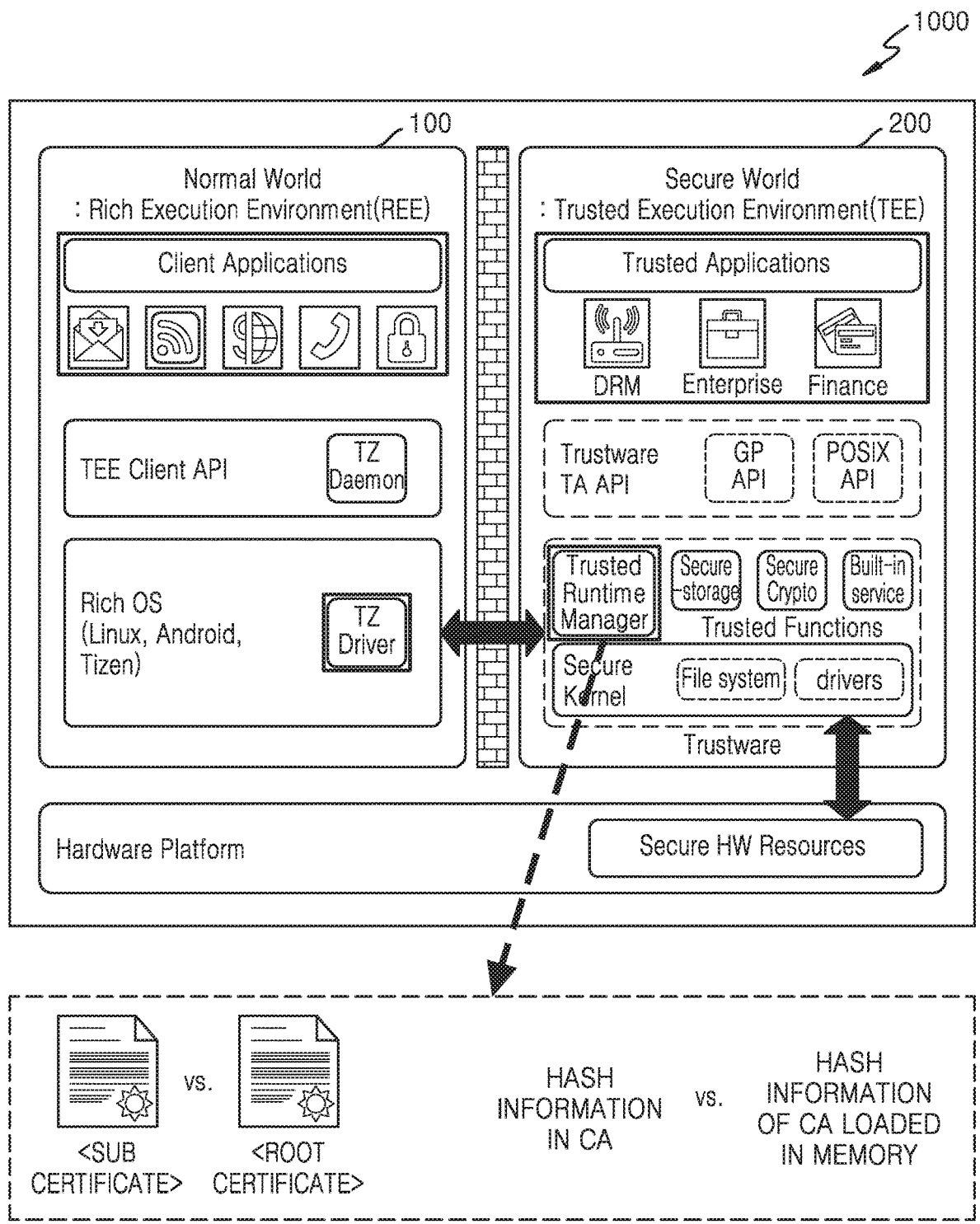
FIG. 1 shows an execution environment of a device that provides a TrustZone technique according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Although general terms being widely used in the disclosure were selected as terminology while considering the functions of the disclosure, they may vary according to intentions of one of ordinary skill in the art, judicial precedents, the advent of new technologies, and the like. Hence, the terms must be defined based on the meanings of the terms and the contents of the entire disclosure, not by simply stating the terms themselves.

Although the terms "first", "second", etc. may be used herein to describe various components, these components should not be limited by these terms. These terms are only used to distinguish one component from another.

It will be understood that when a component is referred to as being "connected" to another component, it may be "directly connected" to the other component or "electrically connected" to the other component with an intervening component. Also, in the entire disclosure, it will be understood that when a certain part "includes" a certain component, the part does not exclude another component but may further include another component, unless the context clearly dictates otherwise.

The phrase "in an embodiment", etc. appearing in the disclosure may not indicate the same embodiment.

An embodiment of the disclosure may be represented by functional block configurations and various processing operations. Some or all of these functional blocks may be implemented with various numbers of hardware and/or software components that perform particular functions. For example, the functional blocks of the disclosure may be implemented by one or more microprocessors or circuit configurations for a given function. Also, for example, the functional blocks of the disclosure may be implemented in various programming or scripting languages. The functional blocks may be implemented with algorithms running on one or more processors. The disclosure may also employ typical techniques for electronic environment settings, signal processing, and/or data processing. The terms "mechanism", "element", "unit" and "configuration" may be used in a broad sense, and are not limited to mechanical and physical configurations.

Also, connection lines or connection members between the components illustrated in the drawings are merely illustrative of functional connections and/or physical or circuit connections. In actual devices, connections between the components may be represented by various functional connections, physical connections, or circuit connections that may be replaced or added.

Hereinafter, the disclosure will be described in detail with reference to the drawings.

FIG. 1 shows an execution environment of a device that provides a TrustZone technique according to an embodiment of the disclosure.

Referring to FIG. 1, an execution environment of a device 1000 which provides the TrustZone technique may include a normal world 100 and a secure world 200.

A trust zone (TZ) may divide a processor core into the normal world 100 and the secure world 200. The normal world 100 may be a rich execution environment (REE) where a client application (hereinafter, referred to as a CA) and operating system (OS) are driven. Also, the secure world 200, which is a hardware-based isolation trusted execution environment (TEE) physically isolated from the normal world 100, may execute a TEE trusted application (hereinafter, referred to as a TA).

The CA may be executed on rich OS of the normal world 100, and the TA may be executed on secure OS of the secure world 200.

By the TrustZone technique, different table addresses may be used for translation between virtual addresses and physical addresses, and accordingly, the normal world 100 and the secure world 200 may access different address spaces. Also, a memory area that is accessible only in the secure world 200 may be designated.

For a CA of the normal world 100 to access a resource in the secure world 200, the CA may need to use a communication interface between a TEE client (hereinafter, referred to as a TC) and a TEE trusted application (hereinafter, referred to as a TA), and the CA of the normal world 100 may be accessible to a limited resource in the secure world 200 after being authenticated.

When a CA in the normal world 100 requests a TA in the secure world 200 to transmit a service, the device 1000 may compare a sub certificate of the CA to a root certificate of the TA, and compare hash information in the CA to hash information of the CA loaded in a memory, thereby authenticating the CA which wants to use the service of the TA.

The device 1000 may be a smart phone, a tablet PC, a PC, a smart TV, a mobile phone, a personal digital assistant (PDA), a laptop, a media player, a micro server, a global positioning system (GPS), an e-book terminal, a digital broadcast terminal, a navigation system, a kiosk, an MP3 player, a digital camera, a home appliance, a mobile computing device, or a non-mobile computing device, although embodiments are not limited thereto. Also, the device 1000 may be a wearable device, such as a watch, glasses, a hair band, and a ring, which has a data processing function. However, the device 1000 is not limited to the above-mentioned devices, and may include all kinds of devices operating based on OS by using a processor.

Figure 2:
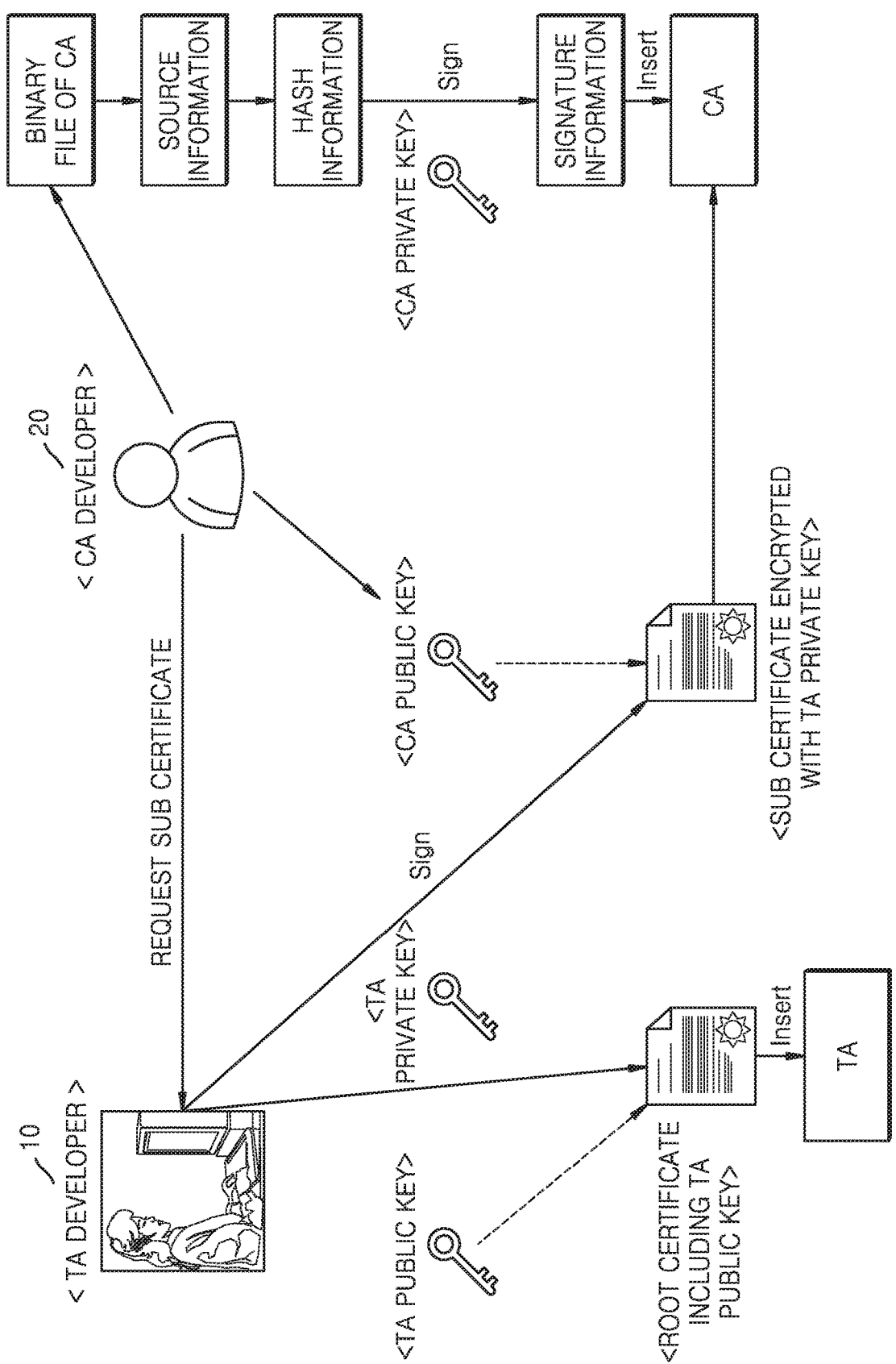
FIG. 2 is a view for describing a root certificate, a sub certificate, and signature information of a client application (CA) according to an embodiment of the disclosure.

FIG. 2 is a view for describing a root certificate, a sub certificate, and signature information of a CA according to an embodiment of the disclosure.

Referring to FIG. 2, a TA developer 10 may include, when developing a TA, a root certificate of the TA in the TA. When a CA developer 20 requests the TA developer 10 to transmit a sub certificate, the TA developer 10 may provide a sub certificate matching with the root certificate of the TA to the CA developer 20. The TA developer 10 may encrypt the sub certificate with a TA private key, and provide the encrypted sub certificate to the CA developer 20.

The root certificate of the TA may match with a plurality of sub certificates. The plurality of sub certificates may be assigned to a plurality of CAs, respectively. Because a plurality of sub certificates are provided to various kinds of CAs, various kinds of CAs using a TA may be authenticated.

The CA developer 20 may include, when developing a CA, signature information and a sub certificate in the CA. The CA developer 20 may extract source information from a binary file of the CA, and calculate hash information from the source information. The CA developer 20 may calculate a hash value by using data in a fixed section of the binary file of the CA. The fixed section may be a section of data not changing when being loaded in a memory, among data in the binary file of the CA.

The CA developer 20 may encrypt the calculated hash information with a CA private key to generate the signature information. The CA developer 20 may include a CA public key in the sub certificate encrypted with the TA private key. The CA developer 20 may include the signature information and the encrypted sub certificate in the CA. Also, the TA developer 10 and the CA developer 20 may be the same subject.

Figure 3:
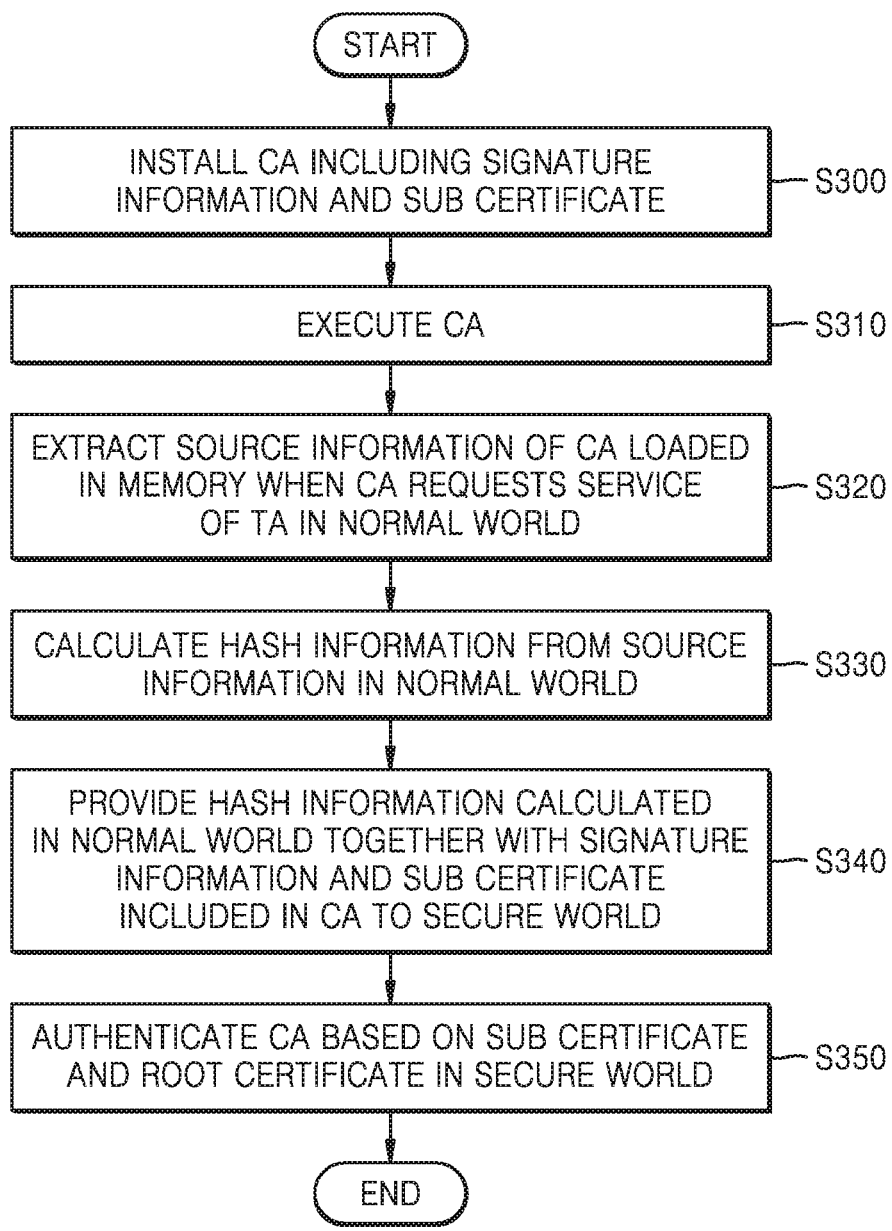
FIG. 3 is a flowchart showing a method of authenticating a CA requesting a service of a trusted application (TA) in a device according to an embodiment of the disclosure.

FIG. 3 is a flowchart showing a method, performed by a device, of authenticating a CA requesting a service of a TA according to an embodiment of the disclosure.

Referring to FIG. 3, in operation S300, the device 1000 may install a CA including signature information and a sub certificate. The device 1000 may access an application providing server (not shown) to download the CA, and install the downloaded CA.

In operation S310, the device 1000 may execute the CA. The device 1000 may execute the CA based on a user input.

In operation S320, when the CA requests a service of a TA, the device 1000 may extract source information of the CA loaded in a memory in the normal world 100. When the CA is executed, a binary file of the CA may be loaded in the memory. The device 1000 may extract the source information of the CA from a fixed section of the binary file of the CA loaded in the memory. The fixed section may be a section of data not changing when being loaded in the memory, among data in the binary file of the CA. For example, the device 1000 may extract ".text" and ".rodata" from an executable and linking format (ELF) file of the CA.

In operation S330, the device 1000 may calculate hash information from the source information in the normal world 100. The device 1000 may calculate a hash value from the source information based on a predetermined hash algorithm.

In operation S340, the device 1000 may provide the hash information calculated in the normal world 100, together with the signature information and sub certificate included in the CA, to the secure world 200. The device 1000 may provide the hash information calculated in the operation S330, together with the signature information and sub certificate included in advance in the CA, from the normal world 100 to the secure world 200. The signature information included in the CA may have been generated by encrypting hash information calculated by a CA developer with a CA private key of the CA developer. Also, the sub certificate may be a certificate provided from a TA developer and included in the CA, and may have been encrypted with a TA private key of the TA developer.

In operation S350, the device 1000 may authenticate the CA based on the sub certificate and a root certificate, in the secure world 200. In the secure world 200, the device 1000 may determine whether the sub certificate of the CA corresponds to the root certificate of the TA. A root certificate of a TA may correspond to a plurality of sub certificates. Accordingly, the device 1000 may acquire a root certificate of a TA providing a TA service requested by the CA, and determine whether the sub certificate of the CA corresponds to the root certificate of the TA.

Also, when the device 1000 determines that the sub certificate of the CA corresponds to the root certificate of the TA, the device 1000 may decrypt the signature information of the CA with a CA public key to acquire hash information. The device 1000 may compare the hash information acquired from the signature information to the hash information calculated in the normal world 100 to authenticate the CA.

Figure 4:
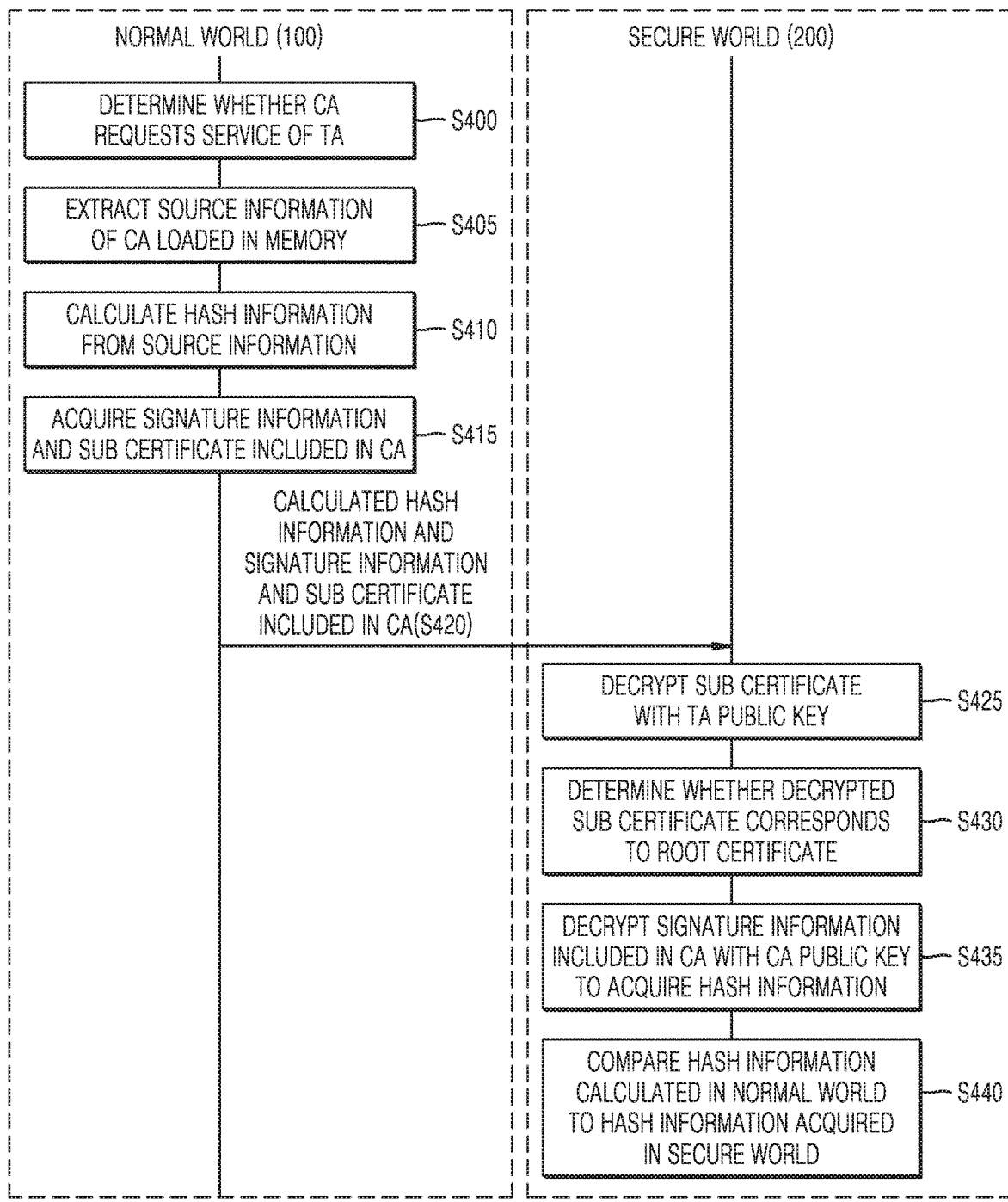
FIG. 4 shows a method used by a device to authenticate a CA requesting a service of a TA in a normal world and a secure world of a trust zone according to an embodiment of the disclosure.

FIG. 4 shows a method, performed by a device, of authenticating a CA requesting a TA service in the normal world 100 and the secure world 200 of the trust zone according to an embodiment of the disclosure.

Referring to FIG. 4, in operation S400, the device 1000 may determine whether a CA requests a service of a TA, in the normal world 100. When a CA is executed in the normal world 100, and a function requiring a service of a TA among functions of the CA is executed, the CA of the normal world 100 may request an execution of the TA to access the TA of the secure world 200. The TA may include, for example, a security application and a financial application, although embodiments are not limited thereto.

In operation S405, the device 1000 may extract source information of the CA loaded in the memory, in the normal world 100. When the CA is executed in the normal world 100, a binary file of the CA may be loaded in the memory, and the device 1000 may extract the source information of the CA from a fixed section of the binary file of the CA loaded in the memory. The fixed section may be a section of data not changing when being loaded in the memory, among data in the binary file of the CA. Also, the source information may include, for example, a source code of the CA. For example, the device 1000 may extract ".text" and ".rodata" from an ELF file of the CA. When the function requiring the service of the TA among the functions of the CA is executed, the device 1000 may extract the source information of the CA from the memory.

In operation S410, the device 1000 may calculate hash information from the source information, in the normal world 100. The device 1000 may calculate a hash value from the source information based on a predetermined hash algorithm. The device 1000 may calculate the hash value from the source information by using a pre-set hash function.

In operation S415, the device 1000 may acquire signature information and a sub certificate included in the CA, in the normal world 100. When the device 1000 downloads a CA from an application providing server (not shown), the CA may include signature information and a sub certificate. When the function requiring the service of the TA among the functions of the CA is executed, the device 1000 may acquire the signature information and sub certificate included in the CA.

The signature information included in the CA may have been generated by a CA developer. For example, the signature information included in the CA may have been generated by encrypting the hash information calculated from the source information of the CA by the CA developer with a CA private key of the CA developer. Also, the sub certificate may be a certificate provided to the CA developer from a TA developer and included in the CA by the CA developer. The sub certificate may have been encrypted with a TA private key of the TA developer.

In operation S420, the device 1000 may provide the calculated hash information, the signature information included in the CA, and the sub certificate included in the CA to the secure world 200 from the normal world 100.

In operation S425, the device 1000 may decrypt the sub certificate with a TA public key, in the secure world 200. The device 1000 may acquire the TA public key included in a root certificate of the TA from the root certificate, and decrypt the sub certificate with the TA public key, in the secure world 200. The sub certificate may have been encrypted with the TA private key by the TA developer.

In operation S430, the device 1000 may determine whether the decrypted sub certificate corresponds to the root certificate, in the secure world 200. The device 1000 may identify a TA providing the TA service requested by the CA, and acquire a root certificate of the identified TA, in the secure world 200. The root certificate of the TA may be a certificate included in advance in the TA by the TA developer. Also, the device 1000 may determine whether the decrypted sub certificate matches with the root certificate of the TA.

In operation S435, the device 1000 may decrypt the signature information included in the CA with a CA public key to acquire hash information, in the secure world 200. When the device 1000 determines that the decrypted sub certificate matches with the root certificate of the TA, the device 1000 may acquire the hash information from the signature information.

The device 1000 may acquire the CA public key from the sub certificate, and decrypt the signature information with the CA public key. By decrypting the signature information, the device 1000 may acquire the hash information calculated by the CA developer from the source information of the CA.

In operation S440, the device 1000 may compare the hash information calculated in the normal world 100 to the hash information acquired in the secure world 200, in the secure world 200. The device 1000 may determine whether the hash information calculated in the normal world 100 is identical to the hash information acquired in the secure world 200. When the device 1000 determines that the hash information calculated in the normal world 100 is identical to the hash information acquired in the secure world 200, the device 1000 may authenticate the CA which has requested the TA service.

Figure 5:
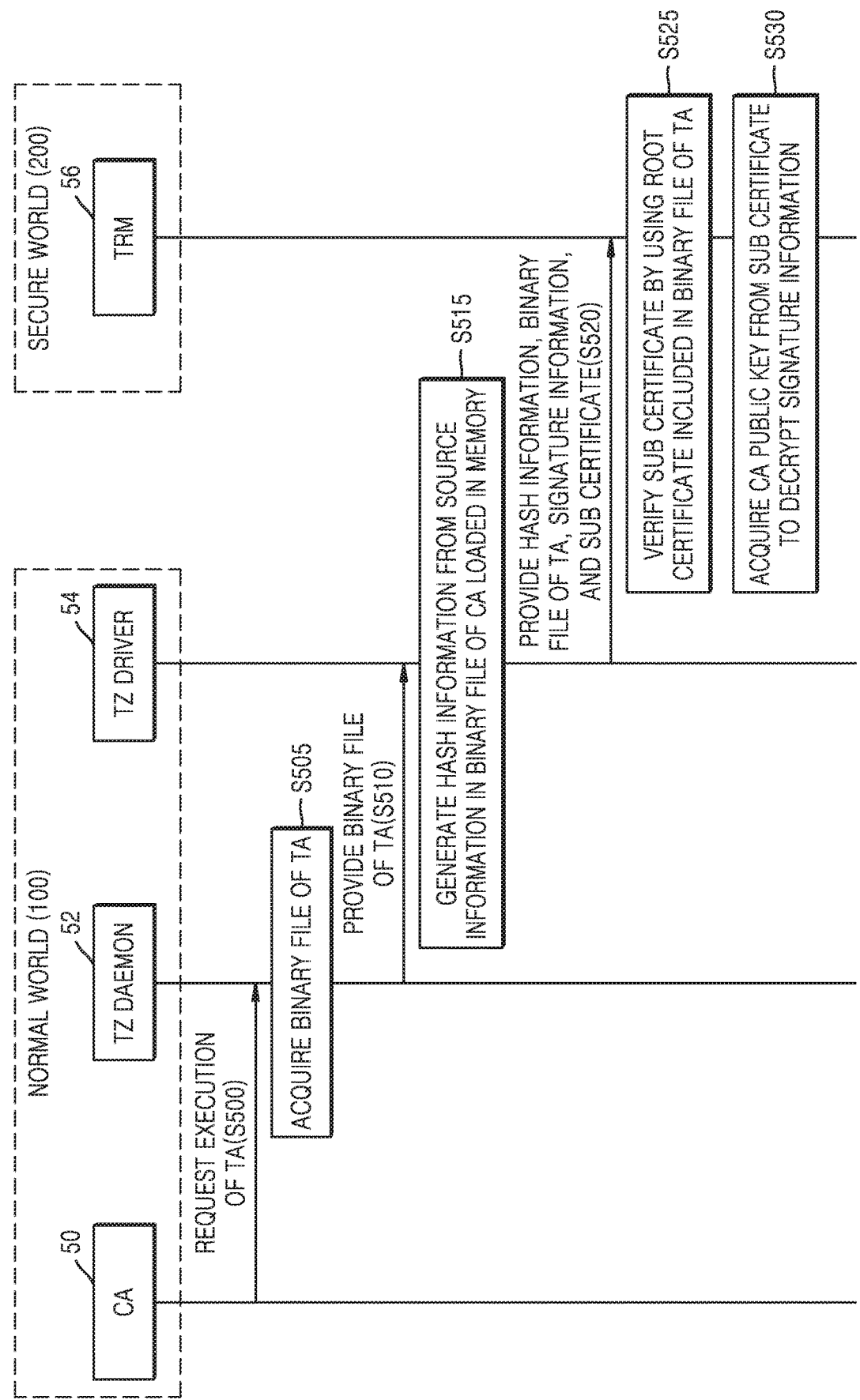
FIG. 5 shows a method used by a device to authenticate a CA requesting a service of a TA in a normal world and a secure world of a trust zone according to an embodiment of the disclosure.

FIG. 5 shows a method, performed by a device, of authenticating a CA requesting a TA service in a normal world and a secure world of a trust zone according to an embodiment of the disclosure.

Referring to FIG. 5, a CA 50, a TZ daemon 52, and a TZ driver 54 may operate in the normal world 100, and a trusted running manager (TRM) 56 may operate in the secure world 200.

In operation S500, the CA 50 may request the TZ daemon 52 to execute a TA. When a function requiring a TA service is executed on the CA 50, the CA 50 may request the TZ daemon 52 to execute the TA.

In operation S505, the TZ daemon 52 may acquire a binary file of the TA. When an execution of the TA is requested, the TZ daemon 52 may read the binary file of the TA from a memory.

In operation S510, the TZ daemon 52 may provide the binary file of the TA to the TZ driver 54.

In operation S515, the TZ driver 54 may generate hash information from source information in a binary file of the CA loaded in the memory.

In operation S520, the TZ driver 54 may provide the generated hash information, the binary file of the TA, and signature information and a sub certificate included in the CA to the TRM 56.

In operation S525, the TRM 56 may verify the sub certificate by using a root certificate included in the binary file of the TA. The TRM 56 may extract the root certificate from the binary file of the TA provided from the TZ driver 54, and compare the root certificate to the sub certificate. The TZ driver 54 may decrypt the sub certificate with a TA public key, and determine whether the decrypted sub certificate corresponds to the root certificate.

In operation S530, the TRM 56 may acquire a CA public key from the sub certificate to decrypt the signature information. The TRM 56 may decrypt the signature information provided from the TZ driver 54 by using the CA public key included in the sub certificate. Also, the TRM 56 may decrypt the signature information to acquire hash information of the CA.

Figure 6:
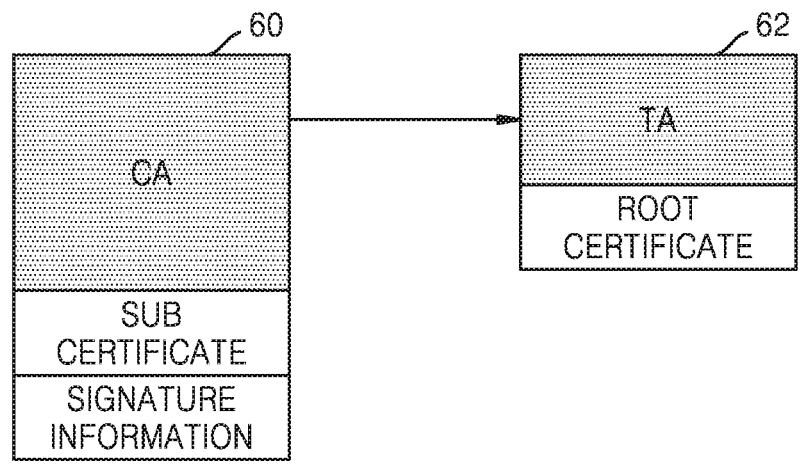
FIG. 6 shows certificates included in a CA and a TA according to an embodiment of the disclosure.

FIG. 6 shows certificates included in a CA and a TA according to an embodiment of the disclosure.

Referring to FIG. 6, a binary file 60 of the CA may include a sub certificate and signature information, and a binary file 62 of a TA may include a root certificate of the TA. The sub certificate may correspond to the root certificate of the TA, and may have been encrypted with a TA private key. The signature information may have been generated by encrypting hash information calculated from source information in the binary file 60 of the CA with a private key of the CA when the CA is developed. The sub certificate may include a CA public key, and the root certificate may include a TA public key.

Figure 7:
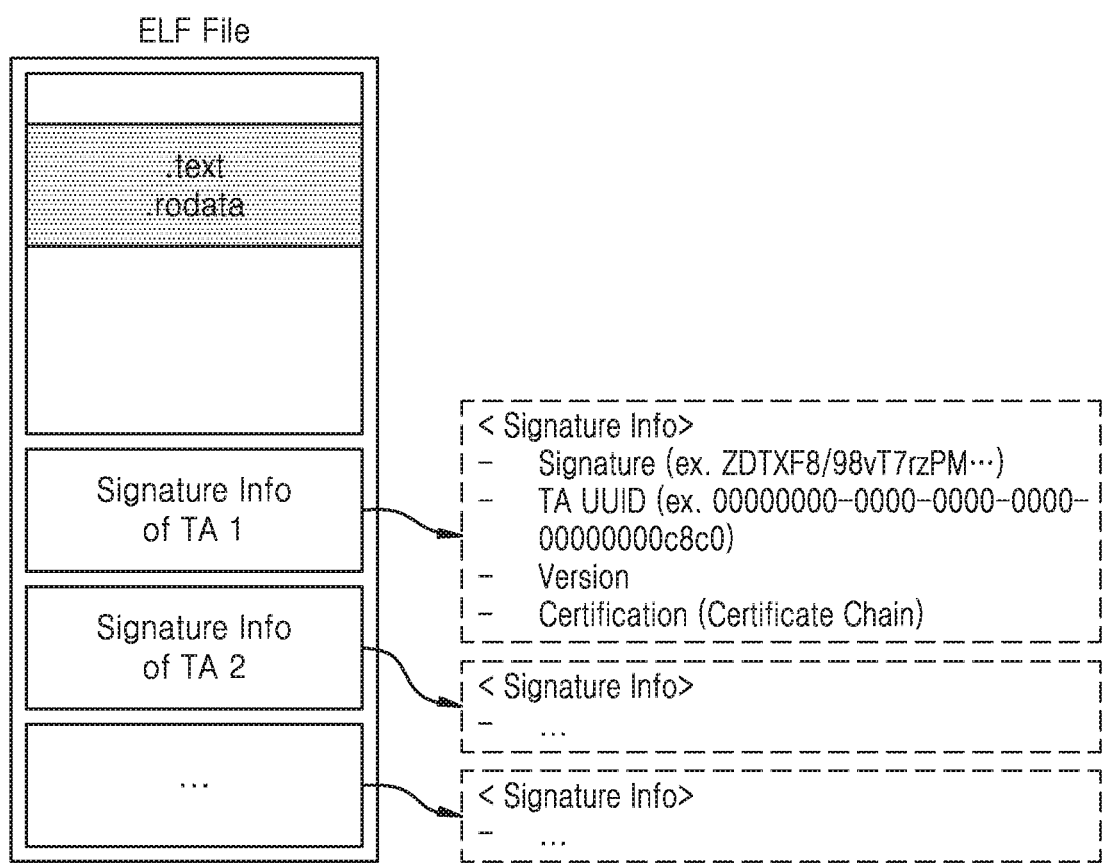
FIG. 7 shows a binary file of a CA according to an embodiment of the disclosure.

FIG. 7 shows a binary file of a CA according to an embodiment of the disclosure.

Referring to FIG. 7, the binary file of the CA may be an ELF file. The binary file of the CA may include, for example, ".text" and ".rodata" as data in a fixed section, and the device 1000 may calculate a hash value by using the ".text" and ".rodata". The fixed section may be a section of data not changing when being loaded in a memory, among data in the binary file of the CA.

Also, the binary file of the CA may include signature information corresponding to a TA required by the CA. For example, the binary file of the CA may include signature information corresponding to TA 1 and signature information corresponding to TA 2, although embodiments are not limited thereto.

When the CA requests a service of the TA 1, the signature information corresponding to the TA 1 may be used to authenticate the CA, and, when the CA requests a service of the TA 2, signature information corresponding to the TA 2 may be used to authenticate the CA.

Also, the signature information corresponding to the TA may include, for example, a signature, an identifier of the TA, a version of a target Trustware, and a sub certificate. The signature may be generated by encrypting the hash value calculated using the ".text" and ".rodata" with a CA private key. The signature of FIG. 7 may be the signature information of FIGS. 1 to 6.

Figure 8:
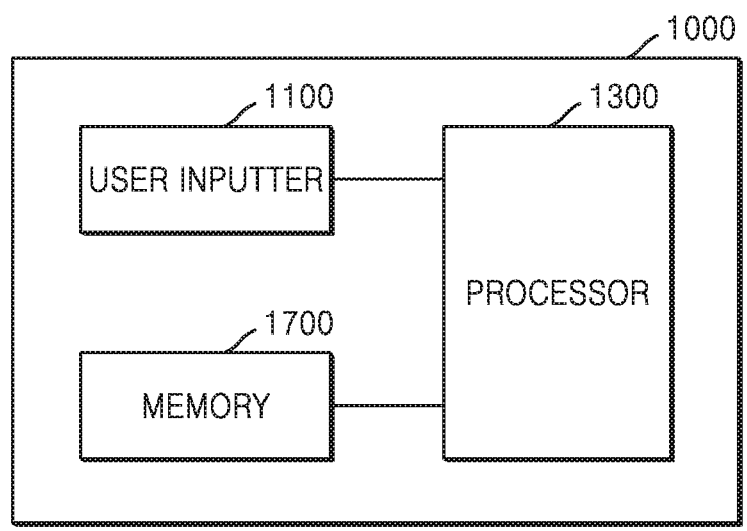
FIG. 8 is a block diagram of a device according to an embodiment of the disclosure.

FIG. 8 is a block diagram of a device according to an embodiment of the disclosure.

Figure 9:
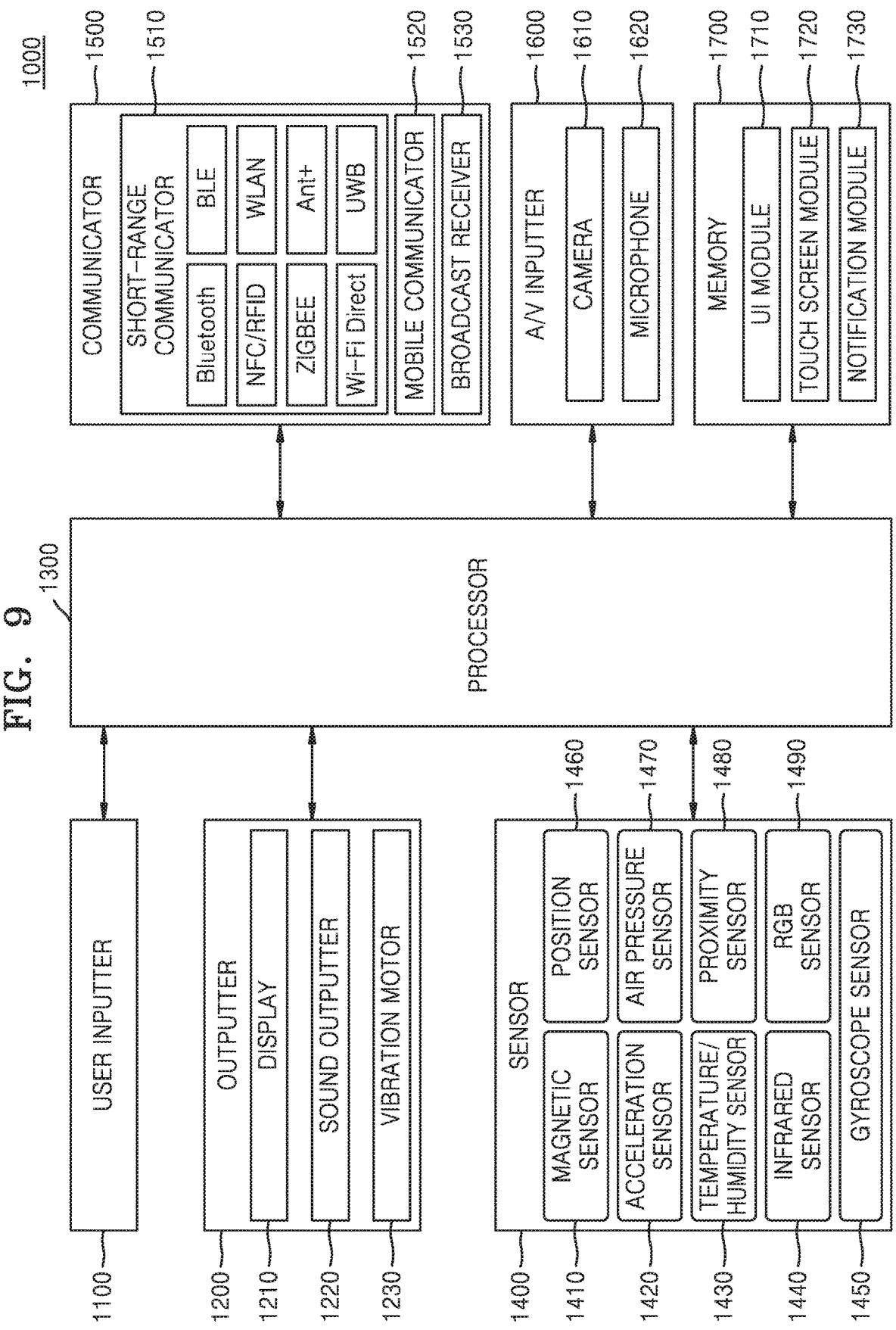
FIG. 9 is a detailed block diagram of a device according to an embodiment of the disclosure.

FIG. 9 is a detailed block diagram of a device according to an embodiment of the disclosure.

Referring to FIG. 8, the device 1000 may include a user inputter 1100, a memory 1700, and at least one processor 1300. However, all components shown in FIG. 8 may not be indispensable components of the device 1000. The device 1000 may be implemented with more components than those shown in FIG. 8 or less components than those shown in FIG. 8.

Referring to FIG. 9, the device 1000 according to various embodiments may further include an outputter 1200, a sensor 1400, an Audio/Video (A/V) inputter 1600, and a communicator 1500, in addition to the user inputter 1100, the memory 1700, and the processor 1300.

Some hardware resources of the device 1000 may be assigned to the secure world 200, and a CA of the normal world 100 may access the hardware resources assigned to the secure world 200 after the CA is authenticated.

The user inputter 1100 may enable a user to input data for controlling the device 1000. For example, the user inputter 1100 may be a key pad, a dome switch, a touch pad (a capacitive type, a resistive type, an infrared beam type, a surface acoustic wave type, an integral strain gauge type, a piezo effect type, etc.), a jog wheel, a jog switch, etc., although embodiments are not limited thereto.

The user inputter 1100 may receive a user input for executing a CA.

The outputter 1200 may output an audio signal, a video signal, or a vibration signal. The outputter 1200 may include a display 1210, a sound outputter 1220, and a vibration motor 1230.

The display 1210 may display information processed by the device 1000. For example, the display 1210 may display a graphical user interface (GUI) related to executions of a CA and a TA.

When the display 1210 and the touch pad form a layer structure to be configured as a touch screen, the display 1210 may be used as an input device, as well as an output device. The display 1210 may include at least one of a liquid crystal display (LCD), a thin film transistor-liquid crystal display (TFT-LCD), an organic light-emitting diode (OLED) display, a flexible display, a 3dimensional (3D) display, or an electrophoretic display.

The sound outputter 1220 may output audio data received from the communicator 1500 or stored in the memory 1700.

The vibration motor 1230 may output a vibration signal. For example, the vibration motor 1230 may output a vibration signal corresponding to an output of audio data or video data (for example, a call signal receiving sound, a message receiving sound, etc.).

In general, the processor 1300 may control overall operations of the device 1000. For example, the processor 1300 may execute programs stored in the memory 1700 to control overall operations of the user inputter 1100, the outputter 1200, the sensor 1400, the communicator 1500, the A/V inputter 1600, etc.

In detail, the processor 1300 may install a CA including signature information and a sub certificate. The processor 1300 may access an application providing server (not shown) to download the CA, and install the downloaded CA. The processor 1300 may execute the CA. The device 1000 may execute the CA based on a user input.

The processor 1300 may also determine whether the CA requests a service of a TA, in the normal world 100. When the CA is executed in the normal world 100, and a function requiring the service of the TA among functions of the CA is executed, the CA of the normal world 100 may request an execution of the TA to access the TA of the secure world 200.

The processor 1300 may extract source information of the CA loaded in the memory 1700, in the normal world 100. When the CA is executed in the normal world 100, a binary file of the CA may be loaded in the memory 1700, and the processor 1300 may extract the source information of the CA from a fixed section of the binary file of the CA loaded in the memory 1700. The fixed section may be a section of data not changing when being loaded in the memory 1700, among data in the binary file of the CA. Also, the source information may include, for example, a source code of the CA. For example, the device 1000 may extract ".text" and ".rodata" from an ELF file of the CA. When the function requiring the service of the TA among the functions of the CA is executed, the processor 1300 may extract the source information of the CA from the memory 1700.

The processor 1300 may calculate hash information from the source information, in the normal world 100. The processor 1300 may calculate a hash value from the source information, based on a predetermined hash algorithm. The processor 1300 may calculate the hash value from the source information by using a pre-set hash function.

The processor 1300 may acquire the signature information and the sub certificate included in the CA, in the normal world 100. When the processor 1300 downloads a CA from an application providing server (not shown), the CA may include signature information and a sub certificate. When the function requiring the service of the TA among the functions of the CA is executed, the processor 1300 may acquire the signature information and the sub certificate included in the CA.

The signature information included in the CA may have been generated by a CA developer. For example, the signature information included in the CA may have been generated by encrypting the hash information calculated from the source information of the CA by a CA developer with a CA private key of the CA developer. Also, the sub certificate may be a certificate provided to the CA developer from a TA developer. The sub certificate may be included in the CA by the CA developer. The sub certificate may have been encrypted with a TA private key of the TA developer.

The processor 1300 may provide the calculated hash information, the signature information included in the CA, and the sub certificate included in the CA to the secure world 200 from the normal world 100.

The processor 1300 may decrypt the sub certificate with a TA public key, in the secure world 200. The processor 1300 may acquire the TA public key included in a root certificate of the TA from the root certificate, and decrypt the sub certificate with the TA public key, in the secure world 200.

The sub certificate may have been encrypted with the TA private key by the TA developer.

The processor 1300 may determine whether the decrypted sub certificate corresponds to the root certificate, in the secure world 200. The processor 1300 may identify a TA providing a TA service requested by the CA, and acquire a root certificate of the identified TA, in the secure world 200. The root certificate of the TA may have been included in advance in the TA by the TA developer. Also, the device 1000 may determine whether the decrypted sub certificate matches with the root certificate of the TA.

The processor 1300 may acquire hash information by decrypting the signature information included in the CA with a CA public key, in the secure world 200. When the decrypted sub certificate matches with the root certificate of the TA, the processor 1300 may acquire the hash information from the signature information.

The processor 1300 may acquire the CA public key from the sub certificate, and decrypt the signature information with the CA public key. When the signature information is decrypted, the processor 1330 may acquire the hash information calculated by the CA developer from the source information of the CA.

The processor 1300 may compare the hash information calculated in the normal world 100 to the hash information acquired in the secure world 200, in the secure world 200. The processor 1300 may determine whether the hash information calculated in the normal world 100 is identical to the hash information acquired in the secure world 200. When the processor 130 determines that the hash information calculated in the normal world 100 is identical to the hash information acquired in the secure world 200, the processor 1300 may authenticate the CA which has requested the TA service.

The sensor 1400 may sense a state of the device 1000 or a state of surroundings of the device 1000 to acquire sensed information, and transfer the sensed information to the processor 1300.

The sensor 1400 may be at least one of a magnetic sensor 1410, an acceleration sensor 1420, a temperature/humidity sensor 1430, an infrared sensor 1440, a gyroscope sensor 1450, a position sensor (for example, a GPS) 1460, an air pressure sensor 1470, a proximity sensor 1480, or an RGB sensor (for example, an illuminance sensor) 1490, although embodiments are not limited thereto.

The communicator 1500 may include one or more components for communication with an external device (not shown) and an external server (not shown). For example, the communicator 1500 may include a short-range communicator 1510, a mobile communicator 1520, and a broadcast receiver 1530.

The short-range communicator 1510 may include, but is not limited to, a Bluetooth communicator, a Bluetooth low energy (BLE) communicator, a near field communication (NFC) unit, a wireless local area network (WLAN) communicator, a Zigbee communicator, an infrared data association (IrDA) communicator, a Wi-Fi Direct (WFD) communicator, an ultra-wideband (UWB) communicator, an Ant+ communicator, and the like.

The mobile communicator 1520 may transmit/receive wireless signals to/from at least one of a base station, an external terminal, or a server on a mobile communication network. The wireless signal may include a voice call signal, a video call signal or various formats of data according to transmission/reception of text/multimedia messages.

The broadcast receiver 1530 may receive broadcast signals and/or broadcast-related information from an external source through a broadcast channel. The broadcast channel may include a satellite channel and a terrestrial channel. According to implementation examples, the device 1000 may not include the broadcast receiver 1530.

The A/V inputter 1600 may be used for input of an audio signal or a video signal, and may include a camera 1610 and a microphone 1620.

The memory 1700 may store programs for processing and control of the processor 1300, and store data input to the device 1000 or to be output from the device 1000.

The memory 1700 may include at least one type of storage medium among a flash memory type, a hard disk type, a multimedia card micro type, a card type memory (for example, Secure Digital (SD) or extreme digital ($_x$D) memory), random access memory (RANI), static random access memory (SRAM), read-only memory (ROM), electrically erasable programmable read-only memory (EEPROM), programmable read-only Memory (PROM), a magnetic memory, a magnetic disk, or an optical disk.

The programs stored in the memory 1700 may be classified into a plurality of modules according to their functions, and for example, the programs may be classified into a user interface (UI) module 1710, a touch screen module 1720, a notification module 1730, etc.

An embodiment of the disclosure may be implemented in the form of a non-transitory computer-readable recording medium that stores instructions being executable by a computer, such as a program module that is executed by a computer. The computer-readable recording medium may be an arbitrary available medium that is accessible by a computer, and may include volatile and non-volatile media and separable and non-separable media. Also, the computer-readable recording medium may include a computer storage medium and a communication medium. The computer storage medium may include volatile and non-volatile media and separable and non-separable media implemented by an arbitrary method or technology for storing information, such as computer-readable instructions, data structures, program modules or other data. The communication medium may include other data of modulated data signals, such as computer-readable instructions, data structures, or program modules.

Also, in the disclosure, the terms "portion", "module", etc. may be a hardware component such as a processor or a circuit, and/or a software component that is executed by a hardware component such as a processor.

The "portion", "module", etc. may be stored in an addressable storage medium, and implemented by a program that is executable by a processor. For example, the "portion", "module", etc. may be implemented by components, such as software components, object-oriented software components, class components, and task components, processes, functions, attributes, procedures, subroutines, segments of program code, drivers, firmware, microcode, circuits, data, a database, data structures, tables, arrays, and variables.

Specific executions described in the disclosure may be an embodiment, and do not limit the scope of the disclosure by any method. For brevity of description, descriptions of typical electronic configurations, control systems, software, and other functional aspects of such systems may be omitted.

Throughout the disclosure, the expression "at least one of a, b or c" indicates only a, only b, only c, both a and b, both a and c, both b and c, all of a, b, and c, or variations thereof.

The aforementioned descriptions are only for illustrative purposes, and it will be apparent that those of ordinary skill in the art may make various modifications thereto without changing the technical spirit and essential features of the disclosure. Thus, it should be understood that the various embodiments described above are merely for illustrative purposes, and not for limitation purposes in all aspects. For example, each component described as a single type may be implemented in a distributed type, and components described as distributed may be implemented in a combined form.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method, performed by a device, of authenticating an application in an execution environment of a trust zone, the method comprising:
    executing a client application (CA) in a normal world;
    receiving a request for receiving, in the normal world, a service of a trusted application (TA) of a secure world from the CA;
    acquiring, when the request is received in the normal world, source information of the CA loaded in a memory of the device, wherein the source information is extracted from a fixed section of a binary file of the CA loaded in the memory;
    acquiring, in the normal world, first hash information from the source information;
    providing, to the secure world, the first hash information together with signature information and a sub certificate included in the CA; and
    authenticating, in the secure world, the CA based on the sub certificate and a root certificate of the TA,
    wherein the root certificate of the TA is matched with a plurality of sub certificates which correspond to a plurality of different CAs, and wherein the sub certificate in the CA is one of the plurality of sub certificates.

2. The method of claim 1, further comprising downloading the CA including the signature information and the sub certificate from a server.

3. The method of claim 1, wherein the authenticating of the CA comprises determining whether the sub certificate corresponds to the root certificate of the TA.

4. The method of claim 3, wherein the authenticating of the CA further comprises:
    acquiring second hash information from the signature information; and
    comparing the second hash information acquired from the signature information with the first hash information acquired in the normal world.

5. The method of claim 3,
    wherein the sub certificate is encrypted with a TA private key, and
    the determining of whether the sub certificate corresponds to the root certificate of the TA comprises:
        acquiring a TA public key from the root certificate of the TA; and
        decrypting the sub certificate with the TA public key.

6. The method of claim 4, wherein the comparing of the second hash information with the first hash information comprises:
    acquiring a CA public key from the sub certificate when the sub certificate corresponds to the root certificate of the TA; and
    acquiring the second hash information by decrypting the signature information with the CA public key.

7. The method of claim 6, wherein the signature information is generated by encrypting the second hash information calculated from the source information of the CA with a CA private key.

8. The method of claim 6,
    wherein the sub certificate includes the CA public key, and
    wherein the root certificate includes a TA public key.

9. The method of claim 1, wherein the acquiring of the source information comprises acquiring data for a source code of the CA from the binary file of the CA.

10. The method of claim 1, wherein the root certificate is acquired from a binary file of the TA.

11. A device for authenticating an application in an execution environment in a trust zone, the device comprising:
    a memory storing one or more instructions; and
    at least one processor configured to execute the one or more instructions to:
        execute a client application (CA) in a normal world,
        receive, in the normal world, a request for receiving a service of a trusted application (TA) of a secure world from the CA,
        acquire, when the request is received in the normal world, source information of the CA loaded in the memory of the device, wherein the source information is extracted from a fixed section of a binary file of the CA loaded in the memory,
        acquire, in the normal world, first hash information from the source information,
        provide, to the secure world, the first hash information together with signature information and a sub certificate included in the CA, and
        authenticate, in the secure world, the CA based on the sub certificate and a root certificate of the TA,
    wherein a part of the memory and a part of the at least one processor are assigned to the secure world,
    wherein the root certificate of the TA is matched with a plurality of sub certificates which correspond to a plurality of different CAs, and
    wherein the sub certificate in the CA is one of the plurality of sub certificates.

12. The device of claim 11, wherein the at least one processor is further configured to execute the one or more instructions to download the CA including the signature information and the sub certificate from a server.

13. The device of claim 11, wherein the at least one processor is further configured to execute the one or more instructions to determine whether the sub certificate corresponds to the root certificate of the TA.

14. The device of claim 13, wherein the at least one processor is further configured to execute the one or more instructions to:
    acquire second hash information from the signature information, and
    compare the second hash information acquired from the signature information to the first hash information acquired in the normal world.

15. The device of claim 13,
    wherein the sub certificate is encrypted with a TA private key, and
    the at least one processor is further configured to execute the one or more instructions to:
        determine whether the sub certificate corresponds to the root certificate of the TA by acquiring a TA public key from the root certificate of the TA, and
        decrypting the sub certificate with the TA public key.

16. The device of claim 14, wherein the at least one processor is further configured to execute the one or more instructions to:
  acquire, when the sub certificate corresponds to the root certificate of the TA, a CA public key from the sub certificate, and
  decrypt the signature information with the CA public key to acquire the second hash information.

17. The device of claim 16, wherein the signature information is generated by encrypting the second hash information calculated from the source information of the CA with a CA private key.

18. The device of claim 16,
  wherein the sub certificate includes the CA public key, and
  wherein the root certificate includes a TA public key.

19. The device of claim 11, wherein the at least one processor is further configured to execute the one or more instructions to acquire the source information by acquiring data for a source code of the CA from the binary file of the CA.

20. The device of claim 11, wherein the root certificate is acquired from a binary file of the TA.

21. The method of claim 1, wherein the source information comprises a source code of the CA.

22. The device of claim 11, wherein the source information comprises a source code of the CA.

* * * * *